United States Patent
Brelin

(10) Patent No.: US 6,647,448 B1
(45) Date of Patent: Nov. 11, 2003

(54) METHOD AND APPARATUS FOR MANAGING RESOURCE SCHEDULES IN A PEER TO PEER DISTRIBUTED NETWORKING ENVIRONMENT

(75) Inventor: Jon Ebbe Brelin, San Jose, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 562 days.

(21) Appl. No.: 09/606,552

(22) Filed: Jun. 29, 2000

(51) Int. Cl.$^7$ .............................................. G06F 13/00
(52) U.S. Cl. ...................................... 710/107; 709/104
(58) Field of Search ............................ 710/107, 48, 72, 710/260, 240, 112, 105; 709/100, 102, 104, 107, 229, 223; 701/1; 345/716, 966; 386/39; 463/1; 455/557, 67.1; 379/201.01; 370/254, 29; 725/87, 101

(56) References Cited

U.S. PATENT DOCUMENTS

| | | | |
|---|---|---|---|
| 4,780,821 A | 10/1988 | Crossley ..................... 364/200 |
| 5,077,732 A | 12/1991 | Fischer et al. ............. 370/85.4 |
| 5,117,070 A | 5/1992 | Ueno et al. .................. 178/2 R |
| 5,367,679 A | 11/1994 | Khaira ........................ 395/650 |
| 5,394,522 A | 2/1995 | Sanchez-Frank et al. ... 395/159 |
| 5,422,883 A | 6/1995 | Hauris et al. .................. 370/62 |
| 5,471,474 A | 11/1995 | Grobicki et al. ........... 370/85.2 |
| 5,499,018 A | 3/1996 | Welmer .................. 340/825.07 |
| 5,500,934 A | 3/1996 | Austin et al. ................ 395/755 |
| 5,548,722 A | 8/1996 | Jalalian et al. ........... 395/200.1 |
| 5,555,413 A * | 9/1996 | Lohman et al. |
| 5,557,724 A | 9/1996 | Sampat et al. ............... 395/157 |
| 5,574,867 A | 11/1996 | Khaira ........................ 395/293 |
| 5,682,489 A | 10/1997 | Harrow et al. .............. 395/349 |
| 5,719,942 A | 2/1998 | Alred et al. ................... 380/49 |
| 5,724,646 A * | 3/1998 | Ganek et al. |
| 5,793,366 A | 8/1998 | Mano et al. ................. 345/329 |
| 5,815,678 A | 9/1998 | Hoffman et al. ............ 395/309 |
| 5,933,430 A | 8/1999 | Osakabe et al. ............ 370/395 |
| 5,991,520 A | 11/1999 | Smyers et al. .............. 395/280 |

(List continued on next page.)

FOREIGN PATENT DOCUMENTS

| | | | |
|---|---|---|---|
| EP | 0 577 054 A1 | 1/1994 | ............ H04N/7/18 |
| EP | 0 631 247 A2 | 12/1994 | ............ G06F/15/44 |
| EP | 0 789 502 A2 | 8/1997 | ............ H04Q/11/04 |

OTHER PUBLICATIONS

Michael Teener et al., "A Bus on a Diet—The Serial Bus Alternative, An Introduction to the P1394 High performance Serial Bus" Apple Computer, Inc. Santa Clara, CA, Pub Date.: Feb. 24, 1992, pp. 316–321.

P1394 Standard For A High Performance Serial Bus, IEEE, 1995.

"The IEEE–1394 High Speed Serial Bus," R.H.J. Bloks, Philips Journal Of Research, vol. 50, No. 1/2, pp. 209–216, 1996.

*Primary Examiner*—Gopal C. Ray
(74) *Attorney, Agent, or Firm*—Haverstock & Owens LLP

(57) ABSTRACT

The invention is an architecture, a system and a method for generating and storing resource schedule entries to an AV/C resource schedule bulletin board subunit. The AV/C resource schedule bulletin board accepts and stores schedule entries posted as requests from a plurality of devices networked through an IEEE 1394 serial bus. The AV/C bulletin board provides each posted schedule entry with a status data field and a progress data field. The status data fields and progress data fields are updated periodically by the system with status values and progress values to reflect the current status and progress of the request. The status values and progress values are used to manage the resource schedule bulletin, resolve schedule conflicts, negotiate resource time between competing control devices and to provide a detailed history of each schedule entry posted to the AV/C bulleting board.

26 Claims, 9 Drawing Sheets

U.S. PATENT DOCUMENTS

| | | | |
|---|---|---|---|
| 6,141,702 A | 10/2000 | Ludtke et al. | 710/5 |
| 6,160,796 A | 12/2000 | Zou | 370/257 |
| 6,169,725 B1 | 1/2001 | Gibbs et al. | 370/216 |
| 6,288,716 B1 | 9/2001 | Humpleman et al. | 345/329 |
| 6,292,624 B1 | 9/2001 | Saib et al. | 386/83 |
| 6,363,434 B1 | 3/2002 | Eytchison | 709/313 |
| 6,370,688 B1 * | 4/2002 | Hejna, Jr. | |
| 6,438,110 B1 * | 8/2002 | Rai et al. | |
| 6,466,971 B1 | 10/2002 | Humpleman et al. | 709/220 |
| 6,513,064 B1 * | 1/2003 | Horiguchi et al. | |
| 6,516,416 B2 * | 2/2003 | Gregg et al. | |

* cited by examiner

*Fig. 2*    (PRIOR ART)

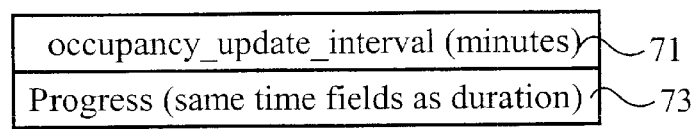

*Fig. 7a*

| Status Value | Description | Meaning |
|---|---|---|
| 00 | Waiting | Used when the contoller is waiting to start, either before the first instance, or repeated instances. |
| 01 | Active | Used when the device is using the resource. |
| 02 | Completed Normally | Used when the device completes its use of the resource. |
| 03 | Completed Abnormally | Used when the device completes its use of the resource abnormally, such as if it was unplugged. |
| 04 | Overridden | Set by another device when an invalid entry is written, or when the original devices does not show up in time. |
| ... | Reserved | |

| Value | Subunit_status | Meaning | |
|---|---|---|---|
| 01 | Ready | Set when subunit finishes with device | ～82 |
| 02 | Active | Set when subunit starts with to use device | ～83 |
| 03 | Overtime | Set when subunit runs longer than duration | ～84 |
| 04 | Relinguish | Set when another controller wants to use subunit when it is set to "Overtime" | ～86 |
| ... | reserved | | |

| |
|---|
| Subunit_info_length |
| subunit_ID[1] |
| Controlling_Node_ID |
| Subunit_status |
| Subunit_ID[2] |
| Controlling_Node_ID |
| Subunit status |
| ... |
| Subunit_ID[n] |
| Controlling_Node_ID |
| Subunit status |

METHOD AND APPARATUS FOR MANAGING RESOURCE SCHEDULES IN A PEER TO PEER DISTRIBUTED NETWORKING ENVIRONMENT

FIELD OF THE INVENTION

The present invention relates to an architecture, a system and a method for scheduling resources over a network. More specifically, this invention relates to an architecture, system and method for dynamic resource scheduling between devices operating within an IEEE 1394 serial bus network.

BACKGROUND OF THE INVENTION

The IEEE standard, "IEEE Std 1394-1995 Standard For A High Performance Serial Bus," is an international standard for implementing an inexpensive high-speed serial bus architecture which supports both asynchronous and isochronous format data transfers. Isochronous data transfers are real-time transfers which take place such that the time intervals between significant instances have the same duration at both the transmitting and receiving applications. Each packet of data transferred isochronously is transferred in its own time period. An example of an ideal application for the transfer of data isochronously would be from a video recorder to a television set. The video recorder records images and sounds and saves the data in discrete chunks or packets. The video recorder then transfers each packet, representing the image and sound recorded over a limited time period, during that time period, for display by the television set. The IEEE 1394 serial bus architecture provides multiple channels for isochronous data transfer between applications. A six bit channel number is broadcast with the data to ensure reception by the appropriate application. This allows multiple applications to simultaneously transmit isochronous data across the bus structure. Asynchronous transfers are traditional data transfer operations which take place as soon as possible and transfer an amount of data from a source to a destination.

The IEEE 1394-1995 standard provides a high-speed serial bus for interconnecting digital devices thereby providing a universal I/O connection. The IEEE 1394-1995 standard defines a digital interface for the applications thereby eliminating the need for an application to convert digital data to analog data before it is transmitted across the bus. Correspondingly, a receiving application will receive digital data from the to bus, not analog data, and will therefore not be required to convert analog data to digital data. The cable required by the IEEE 1394-1995 standard is very thin in size compared to other bulkier cables used to connect such devices. Devices can be added and removed from an IEEE 1394-1995 bus while the bus is active. If a device is so added or removed the bus will then automatically reconfigure itself for transmitting data between the then existing nodes. A node is considered a logical entity with a unique address on the bus structure. Each node provides an identification ROM, a standardized set of control registers and its own address space. Because of the these advantages the IEEE 1394-1995 standard provides for a unique networking structure that is capable of incorporating audio/video devices, media play/record devices and computing/display devices.

A diverse range of products can be implemented with the ability to connect to an IEEE 1394-1995 serial bus network. These devices can have capabilities and functionality ranging from very simple to very complex. Specifically a variety of audio/video devices, media play/record devices and computing/display devices are capable of being linked together over an IEEE 1394 serial bus networking structure to support asynchronous and isochronous data transfers between the devices.

The IEEE 1394-1995 serial bus allows a collection of devices to work together in a high bandwidth, distributed environment to maximize the overall efficiency and functionality of the network. This allows manufacturers to remove expensive pieces of functionality from one device and locate that functionality in another device on the network, instead of duplicating this functionality in all devices on the network. While some of the devices have limited functionality and are relatively inexpensive, such devices require the support and interaction of other devices in order to bring the full functionality of the devices within the network to the user.

The AV/C Digital Interface Command Set is a command set used for data transactions between consumer audio/video equipment over an IEEE 1394-1995 serial bus. Neither the IEEE 1394-1995 serial bus nor the AV/C command set provide a master-slave relationship between the devices coupled within the IEEE 1394-1995 serial bus network. Instead, both the IEEE 1394-1995 serial bus and the AV/C command set operate based on a cooperative peer-to-peer coexistence of devices within the network. Discrete AV/C command and response data packets are transferred between networked devices over an IEEE 1394-1995 serial bus in an asynchronous data stream. The AV/C command and response data packets are typically formatted according to the AV/C protocol outlined in the AV/C Digital Interface Command Set. Transfers of AV/C command and response data packets over the IEEE 1394-1995 serial bus network are supported by an AV/C architecture. The AV/C architecture is comprised of lists and tables that help devices create, process and/or transmit AV/C command and response data packets. The AV/C architecture includes an AV/C bulletin board subunit that is typically dedicated to a resource device subunit such as a tuner, receiver or recoding unit.

An AV/C bulletin board subunit is an information structure that is shared between devices networked over an IEEE 1394-1995 serial bus network. A resource schedule bulletin board is also an information structure that supports information shared between coupled devices within a network. The resource schedule bulletin board provides the organizational structure through which shared data is organized and communicated. The resource schedule bulletin board contains sub-boards of list with entry descriptors that represent encoded data that can be shared between devices within the network via descriptor commands. A dedicated AV/C bulletin board subunit typically supports the information architecture between that device and all compatible posting devices within an IEEE serial bus network. A posting device writes a request entry to a write enabled list within the resource schedule bulletin board specifying when it will use the resource.

Neither the IEEE 1394-1995 serial bus nor the AV/C Command Set provide a master-slave relationship between the devices coupled within the IEEE 1394-1995 serial bus network. Instead, both the IEEE 1394-1995 serial bus and the AV/C Command Set operate based on the cooperative peer-to-peer coexistence of devices within the network transmitting data formatted in accordance with the AV/C protocol. The communicating devices submit command a response data directly with each other without the intervention of a systems resource manager. Each device or device subunit is responsible for managing scheduling affairs and storing resource requests.

Within the current standard AV/C protocol, there are no methods for resolving scheduling conflicts, identifying the progress of schedule entry or for providing for a history of scheduled resource entries. Typically the AV/C protocol operates on a request of use basis, wherein resource time of an available resource device is made available to any requesting device. Within this protocol a device competing for use of a resource device can acquire the right to use the resource device by reserving the resource device, even though another client device may have previously submitted an entry to the resource schedule board requesting the resource device at the same time. There is currently no method for managing the resource schedule bulletin board, resolving schedule conflicts or for providing negotiation of resource time between competing control devices. Further, currently the resource schedule maintained by the resource schedule bulletin board does not always reflect system needs of devices within the network.

SUMMARY OF THE INVENTION:

The invention is an AV/C architecture that provides scheduling functionalities useful for scheduling resource subunits over a network from a plurality of posting or client devices. Preferably, the AV/C architecture supports scheduling of devices that are coupled together over an IEEE 1394-1995 serial bus network. Resource requests are submitted to an AV/C resource schedule bulletin board that posts and stores the submitted requests as schedule entries. Resource requests and schedule entries contain similar request and scheduling information. Resource requests and schedule entries are distinguished, herein, to describe the physical location of the scheduling information within the network. A resource request is request and schedule information that is supplied at a posting or the control device, whereas a schedule entry is request and schedule information that is posted and stored to an AV/C resource schedule bulletin board on a target device. A resource request and its corresponding schedule entry both contain scheduling data which specify a start time, a duration time, an interval time and a repeat count for each request. Further, requests and corresponding schedule entries contain resource subunit identification data that uniquely identifies the resource subunit within the schedule entries.

In accordance with AV/C architecture of the current invention, the AV/C bulletin board provides a status data field for each of the posted schedule entries. Within the status data field, status values are posted to code for the status of the requests within the system. Preferably, unique status values are provided to indicate when a schedule entry is waiting to start, actively being used, completed normally, completed abnormally and when a schedule entry has been overridden by a competing posting device. The status data field is preferably updated by the scheduled posting device when the status of the request has changed, but can also be updated by the resource device.

The AV/C architecture of the current invention also provides for a progress data field in each posted schedule entry. The progress data field is used to post progress values that indicate the progress of the request towards completion. The progress data field is preferably also updated by the scheduled posting device which monitors the progress of its own request and updates the progress data field at the AV/C bulletin within a predetermined time interval. The time interval is set to have any appropriate value that is practical or suitable for the application at hand.

In the preferred embodiment of the invention, the status data field and the progress data field are correlated such that in the event that the posting device fails to update the progress data field within the predetermined time interval, the status data field is updated by the resource device or the system to indicate that the posting device is not responding properly or is off line.

In alternative embodiments of the invention, the AV/C architecture provides for a subunit data field that posts values to, represent the activity of a networked resource subunit. Preferably, unique values are posted within the subunit data field when the resource subunit is ready to be used, actively being used, is running overtime and has been relinquished by a competing schedule entry. The subunit status values are preferably compiled in a table that also posts identification data values for the requesting posting device and the resource subunit.

The updated status fields and progress fields for each schedule entry are stored to provide an execution history for each request submitted and posted to the AV/C resource schedule bulletin board. In the preferred embodiment of the invention, resource requests are submitted with a keep history data field value that informs the system whether or not to save the status and progress values when the status of the request is altered or the request is completed.

In other embodiments of the invention, status values and progress values are communicated between devices and provide a mechanism to negotiate schedule conflicts. In a particular example, the status values and the progress values of resource requests are continually monitored and updated. If a competing control device submits a resource schedule entry to the resource schedule bulletin board that is in conflict with a posted schedule entry, the system sends a message to the control device that specifies whether or not the resource is in use. If the resource is in use, the system preferably sends a message that notifies the competing device of the status and/or progress of the conflicting request and the competing device is given the opportunity to override the conflicting request depending on the status and/or progress of the conflicting request, the system needs or on a hierarchical assignment of the devices within the network.

The architecture, system and method of the current invention preferably provide functionality to a network of devices coupled over an IEEE-1394-1995 serial bus and allow for the AV/C resource bulletin board to reflect the dynamic environment of the network. The invention also provides for enhanced peer-to-peer schedule management between posting devices without requiring a resource manager. While the invention is particularly useful for scheduling audio/video devices over an IEEE-1394-1995 serial bus network, it is also useful for scheduling other network compatible devices, including computers.

BRIEF DESCRIPTION OF THE DRAWINGS

FIGS. 7a–b show a progress data field and a status data field of the AV/C architecture according to the present invention.

FIGS. 8a–b show a table of subunit data field values for posting the status of a resource device subunit and a table for posting subunit status values of all scheduled posting devices within the system of the present invention.

DETAILED DESCRIPTION OF THE DEFERRED EMBODIMENT

Figure 1:
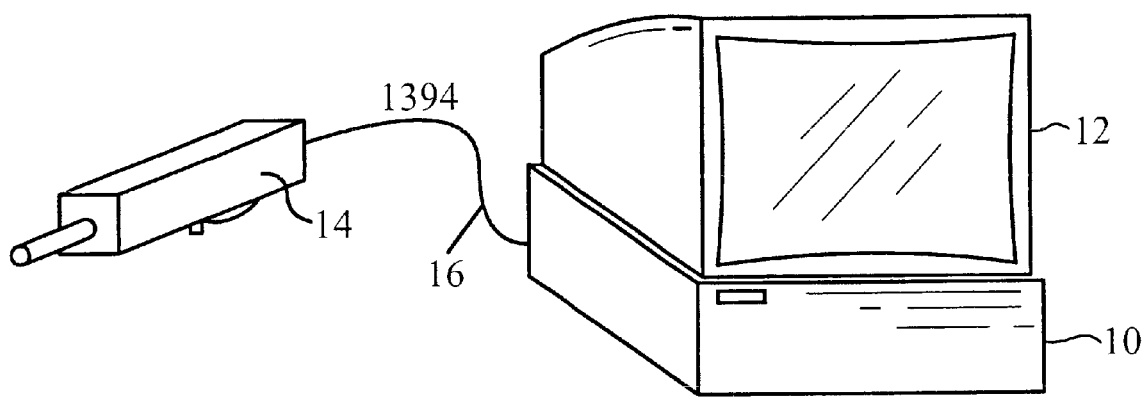
FIG. 1 illustrates a block diagram of an exemplary IEEE 1394-1995 serial bus network including a computer system and a video camera.

A block diagram of an exemplary IEEE 1394-1995 serial bus network including a computer system and a video camera is illustrated in FIG. 1. The computer system 10 includes an associated display 12 and is coupled to the video camera 14 by the IEEE 1394-1995 serial bus cable 16. Video data and associated data are sent between the video camera 14 and the computer 10 over the IEEE 1394-1995 serial bus cable 16.

Figure 2:
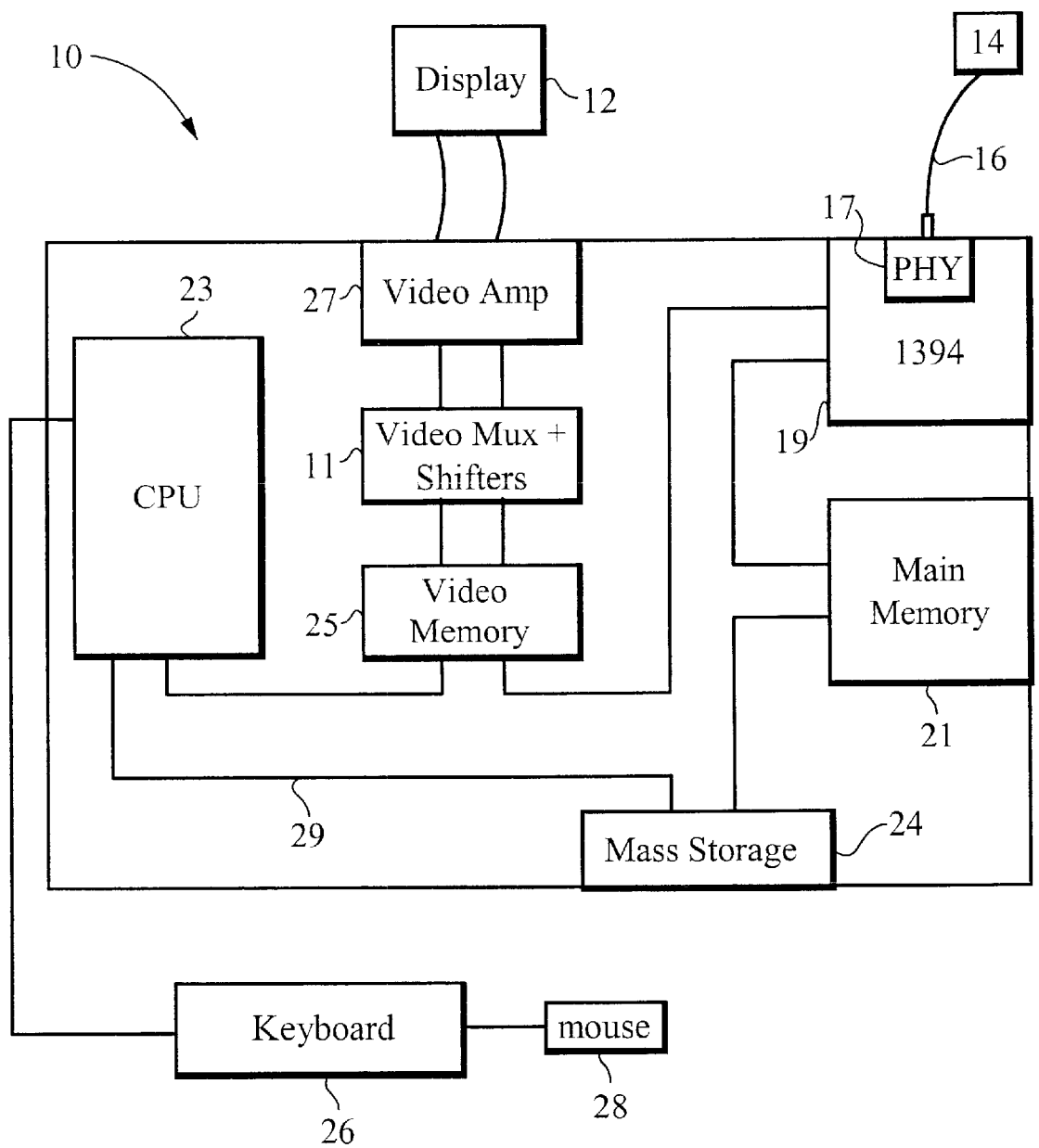
FIG. 2 illustrates a block diagram of the internal components of the computer system 10.

A block diagram of the internal components of the computer system 10 is illustrated in FIG. 2. The computer system 10 includes a central processor unit (CPU) 23, a main memory 21, a video memory 25, a mass storage device 24 and an IEEE 1394-1995 interface circuit 19, all coupled together by a conventional bidirectional system bus 29. The interface circuit 19 includes the physical interface circuit 17 for sending and receiving communications over the IEEE 1394-1995 serial bus. The physical interface circuit 17 is coupled to the camera 14 over the IEEE 1394-1995 serial bus cable 16. In the preferred embodiment of the present invention, the interface circuit 19 is implemented on an IEEE 1394-1995 interface card within the computer system 10. However, it should be apparent to those skilled in the art that the interface circuit 19 can be implemented within the computer system 10 in any other appropriate manner, including building the interface circuit onto the motherboard itself. The mass storage device 24 may include both fixed and removable media using any one or more of magnetic, optical or magneto-optical storage technology or any other available mass storage technology. The system bus 29 contains an address bus for addressing any portion of the memory 25 and 21. The system bus 29 also includes a data bus for transferring data between and among the CPU 23, the main memory 21, the video memory 25, the mass storage device 24 and the interface circuit 19.

The computer system 10 is also coupled to a number of peripheral input and output devices including the keyboard 26, the mouse 28 and the associated display 12.

The keyboard 26 is coupled to the CPU 23 for allowing a user to input data and control to commands into the computer system 10. A conventional mouse 28 is coupled to the keyboard 26 for manipulating graphic images on the display 12 as a cursor control device.

A port of the video memory 25 is coupled to a video multiplex and shifter circuit 11, which in turn is coupled to a video amplifier 27. The video amplifier 27 drives the display 12. The video multiplex and shifter circuitry 11 and the video amplifier 27 convert pixel data stored in the video memory 25 to raster signals suitable for use by the display 12.

Figure 3:
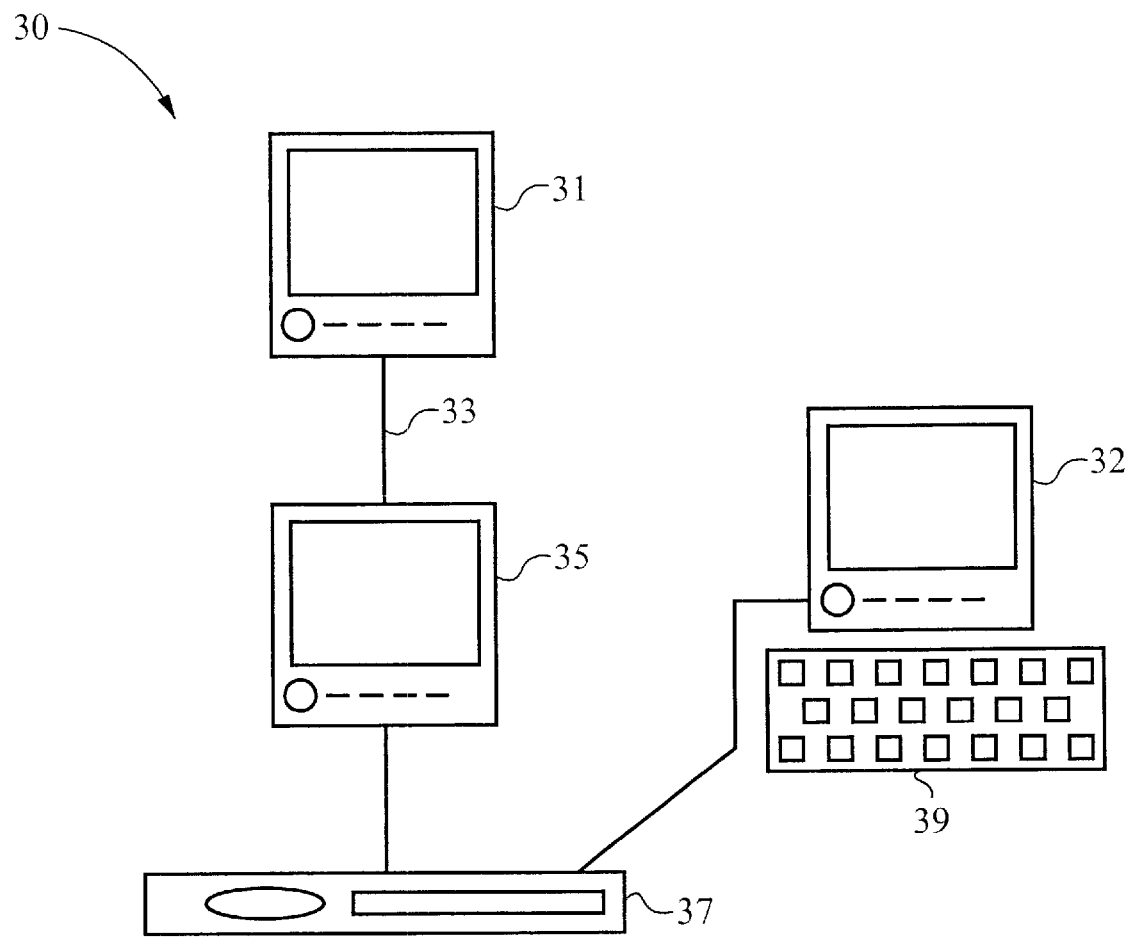
FIG. 3 illustrates a block diagram of a network system within an IEEE 1394-1995 Serial Bus Network according to the present invention.

FIG. 3 illustrates a system of devices 30 coupled within an IEEE 1394-1995 serial bus 33 according to the present invention. The video monitoring devices 31 and 35 are audio/video devices and are coupled to a video recording and media playing device 37 by the IEEE 1394-1995 serial bus 33, as shown. A computing unit 32 is also coupled to the video recording and media playing device 37 by the IEEE 1394-1995 serial bus 33. When a user enters a scheduling request to the computer system 32, the computer system 32 transmits appropriate scheduling request information to the resource schedule board maintained by the video recording and media playing device 37. The schedule information is stored in a posted schedule entry in an AV/C resource schedule bulletin board. FIG. 3 is illustrative only and there are number of system configurations and a diverse range of devices that can be supported within an IEEE 1394-1995 serial bus to provide point-to-point data stream transmissions. Further, there is no systems limitation that all the devices coupled within the IEEE 1394-1995 serial bus need to be used in order to practice the invention.

Figure 4:
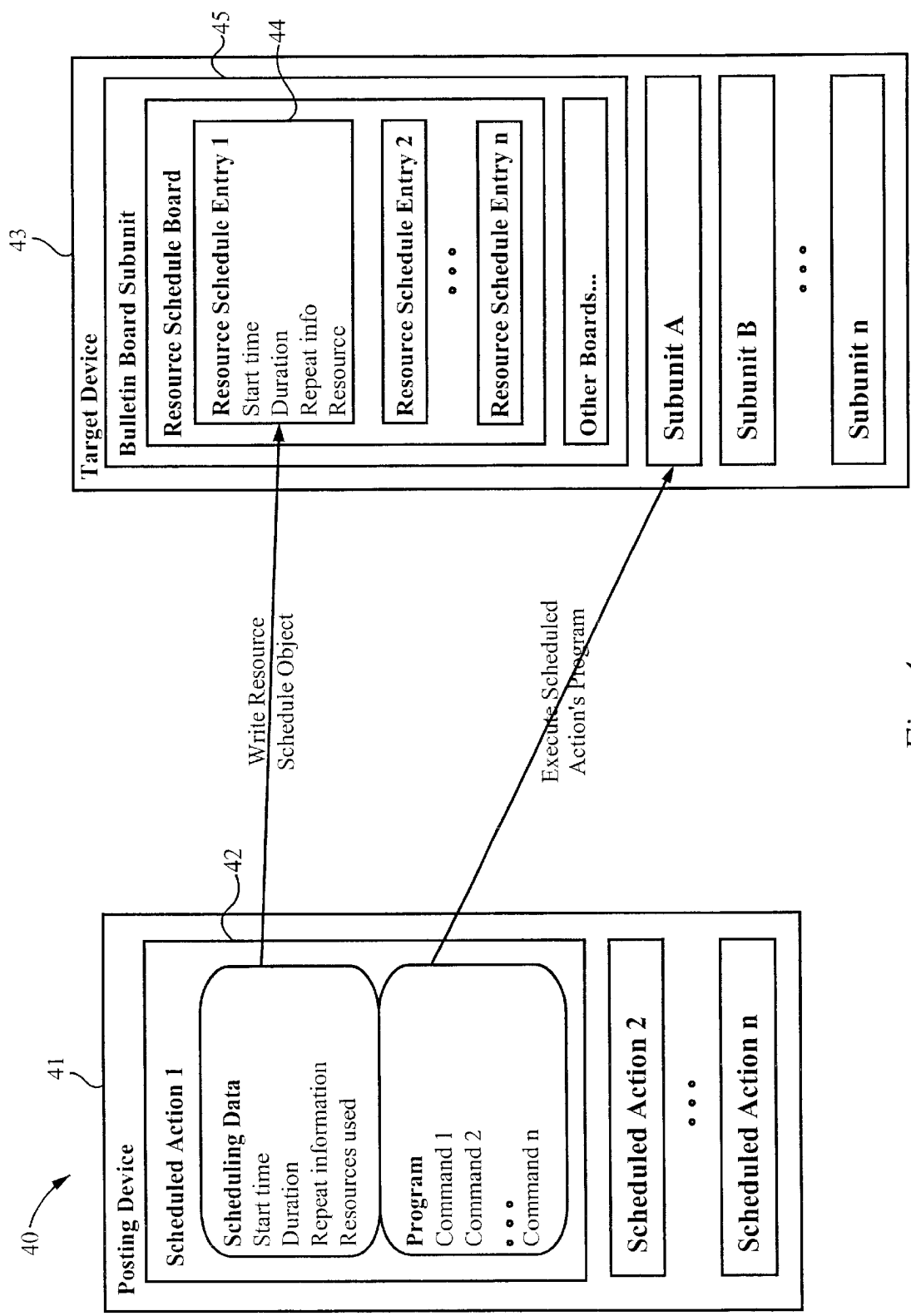
FIG. 4 shows a posting device schedule request and a target device schedule entry.

FIG. 4 illustrates an exemplary network of devices including a posting device 41 and a target device 43. In an embodiment of the invention, resource schedule entries 44, as shown in FIG. 4, contain schedule information for resources. Resource request entries are generated from networked client or scheduling devices 41 using any suitable method known in the art, such as a scheduling protocol supplied with a typical VCR device. The resource request entries are used by a target device 43 which includes the bulletin board subunit including a resource schedule board (RSB) 45 to build a resource schedule according to resource times that are allocated to various resource subunits for the requesting networked client devices. In one embodiment of the current invention, the scheduling data and scheduling architecture is transparent to the user and provides information to coordinate data transfer between devices at a systems level. In another embodiment of the current invention scheduling data and resource schedules are accessible to the users over the network. In further embodiments of the invention, viewable scheduling menus and resource schedules are generated by a graphical user interface. A schedule entry is generated by entering schedule data into a scheduling menu and submitting the data as a resource request from the posting device 41 to the target device 43 over the network. Resource requests for all the requesting client devices are stored in a memory unit at a central location and the graphical user interface generates viewable resource schedules therefrom. The internal data structure and the graphical interface used for supporting the scheduling menus is application and device dependent.

Again referring to FIG. 4, resource requests are made by entering schedule data including a start time and date, a duration time, repeat information including an interval value and a number of events value, if appropriate, and a resource indicator in the resource request entry box 42. A resource request containing the scheduling data shown in the box 42 is submitted over the network and transferred to or used to make a new resource schedule entry 44. The resource schedule board 45 includes one or more entries 44, each representing a received resource request and specification indicating that the posting device intends to utilize the resource device according to the information specified in the resource schedule entry 44. In accordance with an alternative embodiment described above, field values in the resource schedule entries 44 are used to provide a graphical user interface with scheduling data needed to generate a resource schedule accessible over the network.

Figure 5:
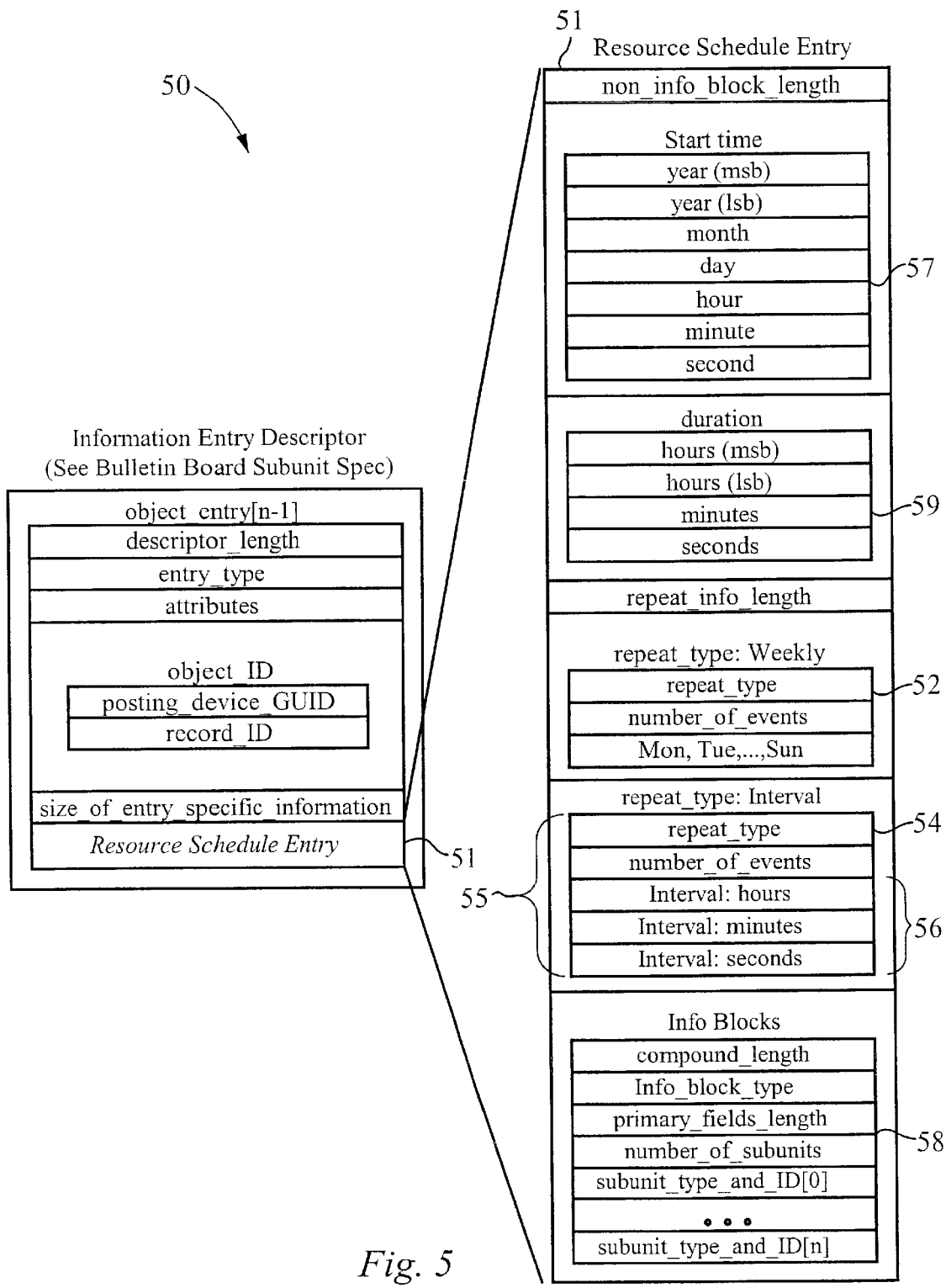
FIG. 5 shows a detailed resource schedule sub-entry within a time data field according to the present invention.

FIG. 5 illustrates a view 50 of a high level schedule entry section 51 detailing the schedule entries that are input from a posting or scheduling device to provide a complete resource request. The start time is input in the entry block 57, the duration time is input in the entry block 59, and resource device information is input in the entry block 58. The repeat-time sequences are input in the entry blocks 55 and 52. Only one of the entry blocks 55 and 52 will be used in each entry, as appropriate. The entry block 52 is used for resource schedule entries to be repeated on a weekly basis. The entry block 55 is used for resource schedule entries to be repeated on a specific interval basis.

In order to specify the repeat-time sequence entries, a number of events value and a repeat interval are required. The number of events value can be equal to any appropriate number, including one, and specifies the number of times the entry is to be repeated. The repeat interval is the time between events and can be daily, weekly, monthly or any appropriate interval. For example, in the entry block 52, intervals such as daily, weekly or monthly are input along with a number in the number_of_events field which specifies the number of events value and represents the number of times that the request is to be executed, and thus defines the overall duration. Also, certain days of the week can be blocked out or not included within the schedule. By blocking out dates within an overall duration, the resource can be more efficiently used by other client devices. For example, a schedule request can contain field values that indicate a resource is needed every day for two weeks except for Tuesday of the second week. Thus, by viewing the resource schedule, other client or scheduling devices can see that the resource is available on that Tuesday and schedule resource time accordingly. It is convenient to provide day selections such as Monday, Thursday etc., as shown in block 52, wherein when a user schedules the resource for a particular day, the resource will automatically be scheduled for that selected day for the overall duration of the schedule entry.

The entry block 55 shows an entry form used for resource schedule entries to be repeated on a specific interval basis. In the entry line 56 a time interval is input, which is either a regular time interval (such as an hour or a day) or an irregular time interval that does not follow a naturally repeating block of time. On the entry line 54, the number of events value is input specifying the number of times the resource request is to be executed. For example, if a user inputs a schedule entry with an interval value corresponding to one hour and 20 minutes and a number of events value equal to nine, then the shared resource will be scheduled for nine one hour and 20 minute intervals, starting at a time specified in the entry block 57, with a duration as specified in the duration entry block 59.

The time data fields for resource requests and schedule entries are chosen to reflect appropriate application of the, system. For example, when scheduling audio/video equipment for home or entertainment it is typically sufficient to specify the hours, minutes and seconds of the request such as those shown in block 59. However, there are particular applications where the time data fields need to be expanded to encompass greater or smaller increments of time. For example, an astronomical study of deep space, may require that audio/video equipment be scheduled for very precise periods of time over the course of a year or more. Therefore, the time data fields that are shown in blocks 57 and 59 are only exemplary and it is understood that they can be expanded to encompass any increment of time that is suitable for the application at hand.

Figure 6:
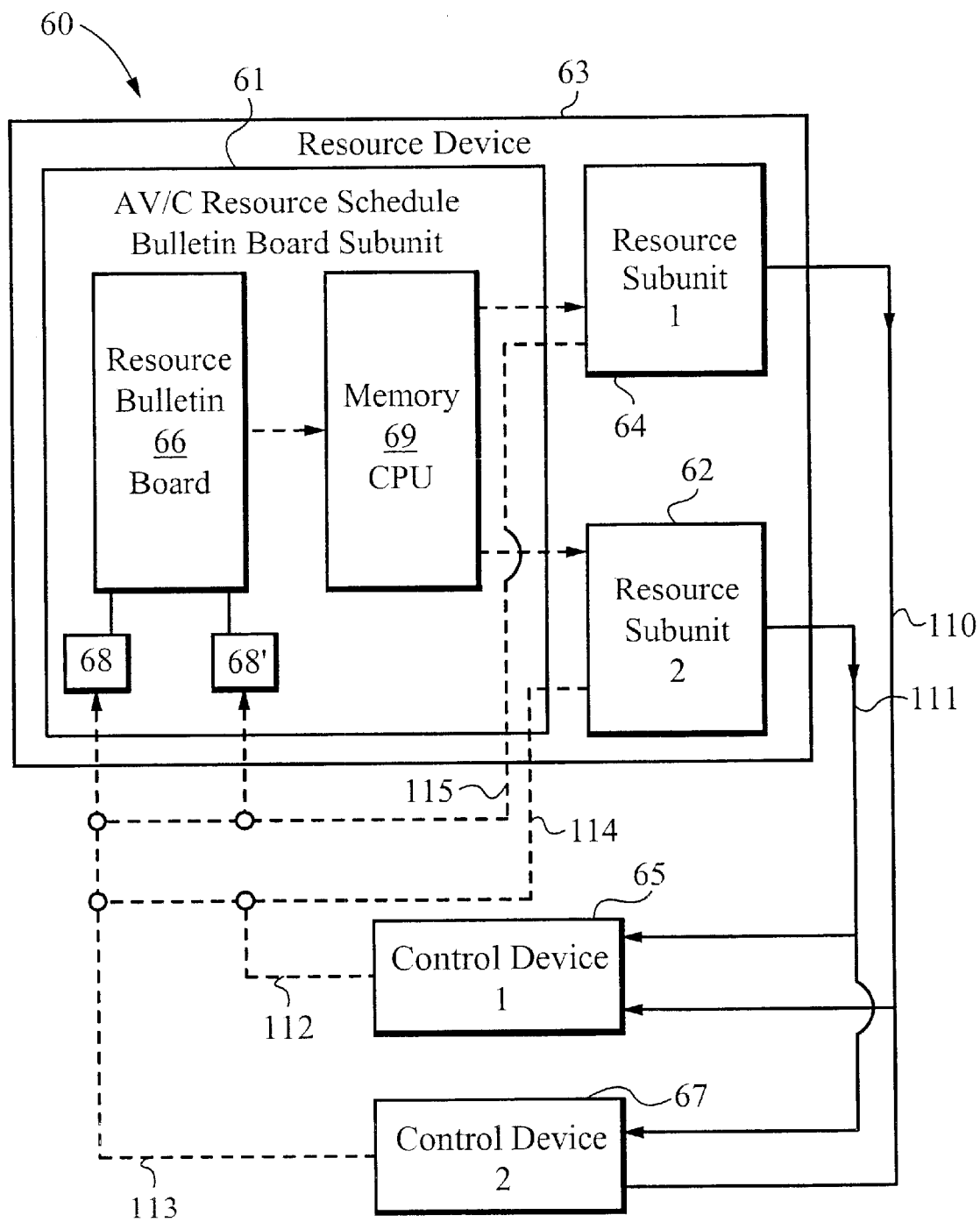
FIG. 6 illustrates a block diagram of a system with posting devices capable of posting schedule entries to an AV/C bulletin board of a coupled resource device.

FIG. 6 illustrates a system 60 with a resource device 63, two posting control devices 65 and 67 and a an AV/C bulletin board subunit 61 according to the present invention. The solid lines 110 and 111 represent lines of content transmission from the resource subunits 62 and 64, respectively. The dashed lines 112, 113, 114 and 115 represent lines of control data transmission from the control devices 65 and 67 and from the resource subunits 62 and 64 to the AV/C resource schedule board subunit 61. The AV/C resource schedule board subunit 61 has an AV/C bulletin board 66 and a memory/CPU unit 69, wherein schedule entries and scheduling data is organized and stored. Control devices 65 and 67 submit resource requests 68 and 68' to the resource schedule bulletin board 66, where the requests are organized and posted as schedule entries and stored in the memory of the subunit 69. Organized schedule entries within the AV/C resource schedule bulletin board provide a resource calendar. Resource time from each of the resource subunits 62 and 64 is allocated to the requesting control devices 65 and 67 according to the resource schedule calendar.

Again referring to FIG. 6, the AV/C bulletin board subunit 61 is preferably transparent to the user and the schedule calendar is updated or modified at the systems level. However, it is considered to be within the scope of the present invention that the AV/C bulletin board subunit 61 is supported by a graphical user interface program (not shown) that provides for direct user participation with device scheduling.

Still referring to FIG. 6, the resource request 68 and 68' submitted by the control client devices 65 and 67 contain scheduling data that informs the resource schedule bulletin board 66 which control device is submitting the request, which resource subunit is being requested and when the resouce is being requested. According to a preferred embodiment of the present invention, the resource schedule bulletin board 66 contains a status data field and a progress data field for each of the posted schedule entries. The status data fields and the progress data fields are updated with status and progress values periodically or when the status of a request has changed. The updated status values and progress values provide the ability for the resouce schedule bulletin board to represent the dynamic scheduling environment of the system 60. The status data field and progress data field are updated by the posting devices 65 and 67, the resource subunits 62 and 64 or by the system 60 as described in detail below. The status and progress values are stored in the memory unit 69 to provide a detailed history of each schedule entry. Further, the status and progress values are used to communicate between the control devices 65 and 67 when a schedule conflict arises.

FIG. 7a shows a progress data field 70 that is preferably provided within each schedule entry posted to the AV/C bulletin board. The progress data field 70 is updated at a predetermined time interval that is set in the data block 71. The updating interval in the data block 71 is chosen to be any value that is suitable for the application at hand. However, the progress data field 70 is typically only updated at the predetermined time interval while the schedule entry is being processed or is active. Within the progress data block 73, progress data values are provided which represent progress towards completing the current requested task. The progress values are used to communicate the progress towards completing the current task to other networked devices. For example, the progress data field values can be used to determine the percentage of time left to complete a request represented within the schedule entry, a percentage of total time that the request has been ongoing, the actual time the request has been ongoing and an estimate of the time left to complete the request. In the event that another device submits a resource request that conflicts with an active request, the progress status value is communicated to the competing device and based on the systems needs the active request can be overridden or the competing device can wait until the request is completed.

Now referring to FIG. 7b, in an alternative embodiment of the invention schedule entries have a status data field similar to the progress data field shown in FIG. 7a which preferably includes one of the status value listed in the table of FIG. 7b. The status data field posts status values 75 to reflect the status 77 of posted schedule entries. The status values 75 can be posted for any number of status conditions but preferably unique status values are posted for when the control device is; waiting to use the resource 76, is actively using the resource 78, has completed the schedule entry normally 79, has completed the schedule entry abnormally 74 or when the schedule entry has been overridden 72.

In yet another embodiment of the present invention, each schedule entry has a progress data field 70, shown in FIG. 7a and a status data field. The scheduled control device is responsible for updating the progress data block 73 within the predetermined period of time set in the data block 71. In the event that the scheduled control device fails to update the progress field 73 in the predetermined period of time, the status data field 77 is updated to indicate that the posting device is operating improperly. This situation can occur if the control device is taken off line or otherwise becomes disabled.

Now referring to FIG. 8a, in yet other embodiments of the present invention, schedule entries contain subunit status data fields similar to the progress data field shown in FIG. 7a which preferably includes one of the status values listed in the table of FIG. 8a. Preferably, each schedule entry has its own subunit status data field that contains a posted subunit status value 80 which represents the status of the scheduled resource subunit 81. Subunit status values can be posted within the schedule entries having a subunit status field to represent any number of subunit conditions, but preferably unique subunit status values 81 are posted when the resource subunit is ready 82, when the resource subunit is active 83, when the resource subunit is running over the time 84, or when the resource subunit has been relinquished by a completing posting device 86. The AV/C architecture of the current invention also provides for a subunit information table 85, as shown in FIG. 8b. The subunit information table 85 stores control device identification codes 88, resource subunit identification codes 87 and resource subunit status values 89 in a convenient format.

Figure 9:
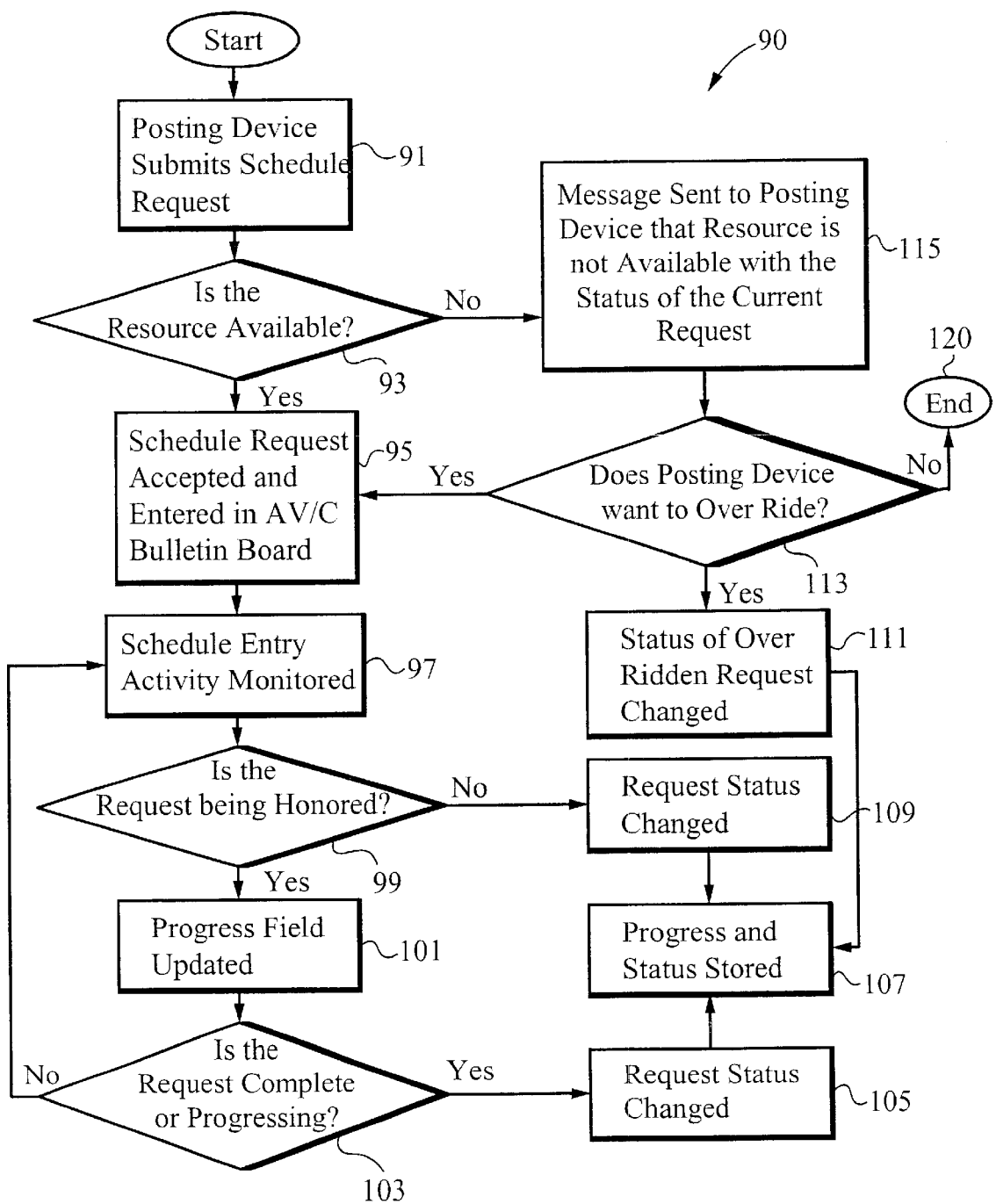
FIG. 9 illustrates a flow diagram according to the method of the preferred embodiment of the present invention.

FIG. 9 is a block-flow diagram 90 according to the method of the preferred embodiment of the present invention. In the step 91, a posting device generates a resource request that contains time field data values to specify a start time, a duration time and an interval time for a resource request. The resource request also identifies the resource subunit and the control device that is making the request. The resource request is submitted over the network to a resource device and in the step 93 the resource device determines whether the resource device subunit is available for the requested time. If the resource subunit is available for the requested time, at the step 95 the request is posted as a schedule entry within the resource bulletin board. The resource schedule entry is provided with a status data field and a progress data field as previously described in FIGS. 7a–b. The posted schedule entry also contains data fields that uniquely identify the control device and the scheduled resource subunit. While the request is active, in the step 97, the system monitors the progress of the request. Specifically, in the step 99, the system determines if the schedule entry is being honored according to the posted time field values. If the system determines that the request is being honored according to the posted time field values, then in the step 101, the progress value is updated to indicate a degree of progress toward completing the request. In the step 103, the system determines whether or not the request has been completed. If it is determined that the request has been completely honored, in the step 105, the status value is changed to show that the request is completed. The completed status value and progress value are then stored in step the 107 to provide a history related to the schedule entry. If in the step 103, the system determines that the request has not been completed, the steps 97–101 including monitoring the activity of the system towards the completion of the request and updating the progress data are repeated until the entry is completely honored or stopped. If it is determined in the step 99 that the entry has been stopped or is interrupted, then in the step 109 the status of the schedule entry is changed and in the step 107, the status and progress value are stored.

In the step 93, if it is determined that the resource subunit is not available at the requested time, then in the step 115 a message is sent to the posting device indicating that the resource is not available during the requested time. Preferably, in the step 115 the message sent to the posting device includes an indication of the current status and progress of the conflicting schedule entry. The posting device, in the step 113, then determines if it wants to override the conflicting schedule entry or whether it will wait until the current task is completed. The decision to override the conflicting schedule entry or to wait is based on the status value and progress value of the conflicting request, on the system needs, the hierarchical position of the competing devices within the system or any combination thereof. If the competing control device chooses to override the conflicting schedule entry, then in the step 95, the new schedule request is accepted and entered in the AV/C bulletin board. Also, in the step 111 the status data field of the overridden schedule entry is updated to show that it has been overridden and in the step 107 the status value and the progress value of the overridden schedule entry are then stored. Otherwise, if the competing control device chooses not to override the conflicting schedule entry then the program, with respect to this request, ends at the step 120.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications can be made in the embodiment chosen for illustration without departing from the spirit and scope of the invention. Specifically, it will be apparent to one of ordinary skill in the art that the device of the present invention could be implemented in several different ways and the architecture, system and method disclosed above are only illustrative of preferred embodiments of the invention. Specifically, it will be apparent to those skilled in the art that while the preferred embodiment of the present invention is used with an IEEE 1394-1995 serial bus structure, the present invention could also be implemented on any other appropriate digital interfaces or bus structures, including other or later versions of the IEEE 1394 serial bus.

What is claimed is:

1. An architecture for scheduling a device resource over a network from a plurality of posting devices, the architecture comprising a resource schedule capable of receiving resource requests and storing posted schedule entries from the plurality of posting devices, wherein each of the resource requests comprise a time data field with a start time, a duration time, an interval time and leach posted schedule entry identifies a requesting posting device, a requested resource and comprises a status data field including a status value that is periodically updated, wherein the schedule entries further comprise a progress data field that is updated with a progress value to post the progress towards completion of the resource request.

2. An architecture for scheduling a device resource over a network from a plurality of posting devices, the architecture comprising a resource schedule capable of receiving resource requests and storing posted schedule entries from the plurality of posting devices, wherein each of the resource requests comprise a time data field with a start time, a duration time, an interval time and each posted schedule entry identifies a requesting posting device, a requested resource and comprises a status data field including a status value that is periodically, updated wherein the status data field is updated by the posting device.

3. An architecture for scheduling a device resource over a network from a plurality of posting devices, the architecture comprising a resource schedule capable of receiving resource requests and storing posted schedule entries from the plurality of posting devices, wherein each of the resource requests comprise a time data field with a start time, a duration time, an interval time and each posted schedule entry identifies a requesting posting device, a requested resource and comprises a status data field including a status value that is periodically updated, wherein the status value is posted when a schedule entry is waiting to start, actively being used, completed normally, completed abnormally and overridden by another posting device.

4. The architecture of claim 1, wherein the progress data field is updated at a predetermined time interval during execution of a posted schedule entry.

5. The architecture of claim 4, wherein the progress data field is updated by the requesting device.

6. The architecture of claim 5, wherein the status data field is updated when the requesting posting device fails to update the progress data field within the predetermined time interval.

7. An architecture for scheduling a device resource over a network from a plurality of posting devices, the architecture comprising a resource schedule capable of receiving resource requests and storing posted schedule entries from the plurality of posting devices, wherein each of the resource requests comprise a time data field with a start time, a duration time, an interval time and each posted schedule entry identifies a requesting posting device, a requested resource and comprises a status data field including a status value that is periodically updated, wherein the resource requests further comprise a keep history data field in which the scheduled requesting posting device saves posted status values and progress values to provide an execution history of the schedule resource entry.

8. An architecture for scheduling a device resource over a network from a plurality of posting devices, the architecture comprising a resource schedule capable of receiving resource requests and storing posted schedule entries from the plurality of posting devices, wherein each of the resource requests comprise a time data field with a start time, a duration time, an interval time and each posted schedule entry identifies a requesting posting device, a requested resource and comprises a status data field including a status value that is periodically updated, wherein the resource schedule is an AV/C resource schedule bulletin board.

9. An architecture for scheduling a device resource over a network from a plurality of posting devices, the architecture comprising a resource schedule capable of receiving resource requests and storing posted schedule entries from the plurality of posting devices, wherein each of the resource requests comprise a time data field with a start time, a duration time, an interval time and each posted schedule entry identifies a requesting posting device, a requested resource and comprises a status data field including a status value that is periodically updated, wherein the network comprises an IEEE 1394-1995 serial bus.

10. An architecture for scheduling a device resource over a network from a plurality of posting devices, the architecture comprising a resource schedule capable of receiving resource requests and storing posted schedule entries from the plurality of posting devices, wherein each of the resource requests comprise a time data field with a start time, a duration time, an interval time and each posted schedule entry identifies a requesting posting device, a requested resource and comprises a status data field including a status value that is periodically updated, further comprising a subunit entry list for the resource device, wherein the subunit entry list posts:

a) a resource subunit identification for each device resource;

b) a posting device identification for each of the posting devices that have posted a resource schedule entry; and c) a status data field to indicate usage status for each posting device that has posted a resource schedule entry.

11. An architecture for scheduling a device resource over a network from a plurality of posting devices, the architecture comprising a resource schedule capable of receiving resource requests and storing posted schedule entries from the plurality of posting devices, wherein each of the resource requests comprise a time data field with a start time, a duration time, an interval time and each posted schedule entry identifies a requesting posting device, a requested resource and comprises a status data field including a status value that is periodically updated, further comprising a subunit status field that posts the status values corresponding to the device resource.

12. The architecture of claim 11, wherein the subunit status field posts status values when the device resource is ready to be used, actively being used, is running overtime and has been relinquished by a competing schedule entry.

13. A method of updating a resource schedule over a network of devices comprising:

a. submitting a resource request from a posting device to the resource schedule wherein the resource request has a start time, a duration time, and an interval time;

b. generating a resource schedule entry that identifies a resource that is scheduled and the posting device submitting the request and comprises a status data field including a status value;

c. monitoring the activity of the resource request;

d. providing the status value within the status data field to represent status of the resource schedule entry; and e. updating the status field and storing the status data each time the status field is updated.

14. A method of updating a resource schedule over a network of devices comprising:

a. submitting a resource request from a posting device to the resource schedule wherein the resource request has a start time, a duration time, and an interval time;

b. generating a resource schedule entry that identifies a resource that is scheduled and the posting device submitting the request and comprises a status data field including a status value;

c. monitoring the activity of the resource request;

d. providing the status value within the status data field to represent status of the resource schedule entry;

e. checking the resource device for availability; and f. notifying the posting device of the resource status prior to the step of generating the schedule entry.

15. A method of updating a resource schedule over a network of devices comprising:

a. submitting a resource request from a posting device to the resource schedule wherein the resource request has a start time, a duration time, and an interval time;

b. generating a resource schedule entry that identifies a resource that is scheduled and the posting device submitting the request and comprises a status data field including a status value;

c. monitoring the activity of the resource request;

d. providing the status value within the status data field to represent status of the resource schedule entry; and e. monitoring the progress of the resource request during its scheduled time.

16. A method of updating a resource schedule over a network of devices comprising:

a. submitting a resource request from a posting device to the resource schedule wherein the resource request has a start time, a duration time, and an interval time;

b. generating a resource schedule entry that identifies a resource that is scheduled and the posting device submitting the request and comprises a status data field including a status value;

c. monitoring the activity of the resource request; and d. providing the status value within the status data field to represent status of the resource schedule entry;

wherein monitoring the activity of the resource request is accomplished by monitoring the activity of the posting device.

17. A method of updating a resource schedule over a network of devices comprising:

a. submitting a resource request from a posting device to the resource schedule wherein the resource request has a start time, a duration time, and an interval time;

b. generating a resource schedule entry that identifies a resource that is scheduled and the posting device submitting the request and comprises a status data field including a status value;

c. monitoring the activity of the resource request;

d. providing the status value within the status data field to represent status of the resource schedule entry; and e. generating a subunit status data field that codes the resource schedule entry for the status of the resource.

18. A method of updating a resource schedule over a network of devices comprising:

a. submitting a resource request from a posting device to the resource schedule wherein the resource request has a start time, a duration time, and an interval time;

b. generating a resource schedule entry that identifies a resource that is scheduled and the posting device submitting the request and comprises a status data field including a status value;

c. monitoring the activity of the resource request; and d. providing the status value within the status data field to represent status of the resource schedule entry;

wherein the resource schedule is an AV/C resource schedule bulletin board.

19. A method of updating a resource schedule over a network of devices comprising:

a. submitting a resource request from a posting device to the resource schedule wherein the resource request has a start time, a duration time, and an interval time;

b. generating a resource schedule entry that identifies a resource that is scheduled and the posting device submitting the request and comprises a status data field including a status value;

c. monitoring the activity of the resource request; and d. providing the status value within the status data field to represent status of the resource schedule entry;

wherein the network comprises an IEEE 1394-1995 serial bus.

20. A system for scheduling a resource over a network, the system comprising:

a) a resource device that executes resource schedule entries posted at an AV/C resource schedule bulletin board that comprises data fields for posting a status of each of the schedule entries; and b) a posting device in communication with the resource device and capable of posting the resource schedule entries to the AV/C bulletin board wherein each of the resource schedule entries include a start time, a duration time, and an interval time.

21. The system of claim 20, wherein the AV/C resource bulletin board further comprises progress data fields for posting the progress of schedule entries during their execution by the resource.

22. The system of claim 20, wherein the resource device further comprises a data storage unit for storing the posted status values and progress values for the resource schedule entries.

23. The system of claim 21, wherein the progress data field is updated with progress data by the posting device at a predetermined time interval while the resource is executing the schedule entries.

24. The system of claim 20, wherein the status data field is updated by the resource device.

25. The system of claim 20, wherein the resource device comprises a video receiver and transmitter.

26. The system of claim 20, wherein the posting device and the resource device are couple together by an IEEE 1394 serial bus.

* * * * *

UNITED STATES PATENT AND TRADEMARK OFFICE
CERTIFICATE OF CORRECTION

PATENT NO. : 6,647,448 B1 Page 1 of 1
DATED : November 11, 2003
INVENTOR(S) : Jon Ebbe Brelin It is certified that error appears in the above-identified patent and that said Letters Patent is hereby corrected as shown below:

Column 1,
Line 48, please replace the phrase "the to bus" with the phrase -- the bus --.

Column 4,
Line 8, please replace the phrase "to, represent" with the phrase -- to represent --.

Column 5,
Lines 11-12, please replace the phrase "THE DEFERRED EMBODIMENT" with the phrase -- A PREFERRED EMBODIMENT --.
Lines 50-51, please remove the new line after the phrase "display 12." and before the phrase "The keyboard 26".
Line 52, please replace the phrase "control to commands" with the phrase -- control commands --.

Column 7,
Lines 48-49, please replace the phrase "the, system" with the phrase -- the system --.

Column 11,
Line 1, please replace "leach" with -- each --.
Line 17, please replace the phrase "periodically, updated wherein" with the phrase -- periodically updated, wherein --.

Signed and Sealed this

Thirtieth Day of March, 2004

JON W. DUDAS
*Acting Director of the United States Patent and Trademark Office*